US008002062B2

(12) United States Patent
Saitou

(10) Patent No.: US 8,002,062 B2
(45) Date of Patent: Aug. 23, 2011

(54) DRIVE UNIT FOR HYBRID VEHICLE

(75) Inventor: Tetsushi Saitou, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 628 days.

(21) Appl. No.: 11/384,026

(22) Filed: Mar. 16, 2006

(65) Prior Publication Data
US 2006/0207812 A1 Sep. 21, 2006

(30) Foreign Application Priority Data

Mar. 16, 2005 (JP) ................................. 2005-076035

(51) Int. Cl.
*B60L 5/00* (2006.01)

(52) U.S. Cl. .... 180/68.3; 180/220; 180/230; 180/65.21; 180/65.31; 180/65.51; 180/65.6; 903/916; 903/951; 903/952

(58) Field of Classification Search .................. 180/219, 180/226, 220, 227, 228, 291, 292, 299, 230, 180/65.2, 65.3, 65.4, 65.5, 65.6, 65.7, 65.21, 180/65.22, 65.225, 65.235, 65.25, 65.31, 180/65.51; 903/916, 951, 952
See application file for complete search history.

(56) References Cited

U.S. PATENT DOCUMENTS

| | | |
|---|---|---|
| 3,566,165 A | 2/1971 | Lohr |
| 3,921,745 A | 11/1975 | McCulloch et al. |
| 4,132,281 A | 1/1979 | Gaddi |
| 4,467,407 A | 8/1984 | Asano |
| 4,536,668 A | 8/1985 | Boyer |
| 4,763,538 A | 8/1988 | Fujita et al. |
| 4,829,208 A | 5/1989 | Uchino |
| 4,869,332 A * | 9/1989 | Fujita et al. ................ 180/65.22 |
| 5,014,800 A | 5/1991 | Kawamoto et al. |
| 5,024,113 A | 6/1991 | Ito et al. |
| 5,036,213 A | 7/1991 | Isozumi |
| 5,087,229 A | 2/1992 | Hewko et al. |

(Continued)

FOREIGN PATENT DOCUMENTS

EP 0 555 773 8/1993

(Continued)

OTHER PUBLICATIONS

Co-Pending U.S. Appl. No. 11/389,514, filed Mar. 24, 2006 in the name of Tetsushi Saitou et al.

(Continued)

*Primary Examiner* — Tony H. Winner
*Assistant Examiner* — Jacob Knutson
(74) *Attorney, Agent, or Firm* — Keating & Bennett, LLP

(57) ABSTRACT

A drive unit includes an engine, a generator, an electric motor and a power distributing device. The engine drives the generator to generate electric power. The electric motor is driven by the electric power generated by the generator and rotates a drive wheel. The power distributing device distributes the drive power generated by the engine between the generator and the drive wheel. A crankshaft of the engine can extend in a transverse direction of the vehicle. The generator, the motor and the power distributing device are disposed on a shaft, which is different from the crankshaft and extends substantially parallel to the crankshaft. The power of the engine and the drive force of the motor are output from a portion of the shaft through the power distributing device and the rotor of the motor.

19 Claims, 8 Drawing Sheets

U.S. PATENT DOCUMENTS

| | | | |
|---|---|---|---|
| 5,144,183 A | 9/1992 | Farrenkopf | |
| 5,272,938 A | 12/1993 | Hsu et al. | |
| 5,294,853 A | 3/1994 | Schluter et al. | |
| 5,304,878 A | 4/1994 | Oda et al. | |
| 5,442,250 A | 8/1995 | Stridsberg | |
| 5,505,277 A | 4/1996 | Suganuma et al. | |
| 5,570,752 A | 11/1996 | Takata | |
| 5,581,136 A | 12/1996 | Li | |
| 5,588,498 A | 12/1996 | Kitada | |
| 5,595,257 A | 1/1997 | Yoshida et al. | |
| 5,691,584 A | 11/1997 | Toida et al. | |
| 5,755,304 A | 5/1998 | Trigg et al. | |
| 5,798,702 A | 8/1998 | Okamoto et al. | |
| 5,818,134 A | 10/1998 | Yang et al. | |
| 5,826,675 A | 10/1998 | Yamamoto | |
| 5,899,828 A | 5/1999 | Yamazaki et al. | |
| 5,915,493 A | 6/1999 | Nakayama | |
| 5,960,901 A | 10/1999 | Hanagan | |
| 6,011,366 A | 1/2000 | Murakami et al. | |
| 6,046,518 A | 4/2000 | Williams | |
| 6,048,289 A | 4/2000 | Hattori et al. | |
| 6,116,363 A | 9/2000 | Frank | |
| 6,121,711 A | 9/2000 | Nakahara et al. | |
| 6,155,364 A * | 12/2000 | Nagano et al. | 180/65.235 |
| 6,155,366 A | 12/2000 | Lin | |
| 6,158,543 A | 12/2000 | Matsuto et al. | |
| 6,190,282 B1 | 2/2001 | Deguchi et al. | |
| 6,190,283 B1 | 2/2001 | Uchida | |
| 6,199,652 B1 | 3/2001 | Mastroianni et al. | |
| 6,252,377 B1 | 6/2001 | Shibutani et al. | |
| 6,276,481 B1 | 8/2001 | Matsuto et al. | |
| 6,315,068 B1 | 11/2001 | Hoshiya | |
| 6,321,863 B1 | 11/2001 | Vanjani | |
| 6,522,959 B1 | 2/2003 | Sawamura et al. | |
| 6,590,306 B2 * | 7/2003 | Terada | 310/75 C |
| 6,736,227 B2 | 5/2004 | Huang et al. | |
| 6,752,226 B2 | 6/2004 | Naito et al. | |
| 6,765,327 B2 | 7/2004 | Hashimoto et al. | |
| 6,799,650 B2 | 10/2004 | Komiyama et al. | |
| 6,823,954 B2 | 11/2004 | Shimabukuro et al. | |
| 6,994,652 B2 | 2/2006 | Atarashi et al. | |
| 7,006,906 B2 | 2/2006 | Kobayashi et al. | |
| 7,017,694 B2 | 3/2006 | Shirazawa | |
| 7,023,102 B2 | 4/2006 | Itoh | |
| 7,047,116 B2 | 5/2006 | Ishikawa et al. | |
| 7,071,642 B2 | 7/2006 | Wilton et al. | |
| 7,077,223 B2 | 7/2006 | Kubodera et al. | |
| 7,104,347 B2 | 9/2006 | Severinsky et al. | |
| 7,223,200 B2 | 5/2007 | Kojima et al. | |
| 7,228,209 B2 | 6/2007 | Izawa et al. | |
| 7,290,629 B2 * | 11/2007 | Ozeki et al. | 180/65.2 |
| 7,328,091 B2 | 2/2008 | Kimura | |
| 2001/0010439 A1 | 8/2001 | Klingler et al. | |
| 2001/0034280 A1* | 10/2001 | Kuga et al. | 474/8 |
| 2003/0019455 A1 | 1/2003 | Onozawa et al. | |
| 2003/0026118 A1 | 2/2003 | Ikimi | |
| 2003/0205422 A1* | 11/2003 | Morrow et al. | 180/65.2 |
| 2003/0221887 A1 | 12/2003 | Hsu | |
| 2003/0230442 A1* | 12/2003 | Huang et al. | 180/65.4 |
| 2004/0055799 A1 | 3/2004 | Atarashi et al. | |
| 2004/0060753 A1 | 4/2004 | Ito et al. | |
| 2004/0158365 A1 | 8/2004 | Tabata et al. | |
| 2004/0173393 A1 | 9/2004 | Man et al. | |
| 2004/0213371 A1 | 10/2004 | Bruder et al. | |
| 2005/0067201 A1* | 3/2005 | Ozeki et al. | 180/65.2 |
| 2005/0111246 A1 | 5/2005 | Lai | |
| 2006/0030454 A1 | 2/2006 | Uchisasai et al. | |
| 2006/0032690 A1 | 2/2006 | Inomoto et al. | |
| 2006/0090945 A1 | 5/2006 | Ishida et al. | |
| 2006/0260851 A1 | 11/2006 | Taue et al. | |
| 2006/0289208 A1 | 12/2006 | Katsuhiro et al. | |
| 2006/0289214 A1 | 12/2006 | Katsuhiro et al. | |
| 2007/0017723 A1 | 1/2007 | Terada et al. | |
| 2007/0029121 A1 | 2/2007 | Saitou et al. | |
| 2007/0216226 A1 | 9/2007 | Matsumoto et al. | |
| 2007/0216452 A1 | 9/2007 | Matsumoto et al. | |

FOREIGN PATENT DOCUMENTS

| | | |
|---|---|---|
| EP | 0 604 981 A2 | 7/1994 |
| EP | 0 819 561 A2 | 1/1998 |
| EP | 0 937 600 A2 | 8/1999 |
| EP | 0 980 821 A2 | 2/2000 |
| EP | 1 065 362 A1 | 1/2001 |
| EP | 1 142 744 A1 | 10/2001 |
| EP | 1 151 892 | 11/2001 |
| EP | 1 270 302 | 1/2003 |
| EP | 1 447 282 A2 | 8/2004 |
| EP | 1 447 530 | 8/2004 |
| EP | 1 518 737 | 3/2005 |
| EP | 1 526 020 | 4/2005 |
| EP | 1 574 379 | 9/2005 |
| EP | 1574379 A2 * | 9/2005 |
| EP | 1 705 049 A2 | 9/2006 |
| JP | 2-7702 | 1/1990 |
| JP | 2-37027 | 2/1990 |
| JP | 03-215154 | 9/1991 |
| JP | 4-185207 | 7/1992 |
| JP | 5-300712 | 11/1993 |
| JP | 8-175474 | 7/1996 |
| JP | 8-175477 | 7/1996 |
| JP | 8-256403 | 10/1996 |
| JP | 09-132042 A | 5/1997 |
| JP | 9-191501 | 7/1997 |
| JP | 10-080001 | 3/1998 |
| JP | 11-122886 | 4/1999 |
| JP | 11-034965 | 9/1999 |
| JP | 2000-094973 A | 4/2000 |
| JP | 2000-337192 | 5/2000 |
| JP | 2000-261911 | 9/2000 |
| JP | 2000-261988 | 9/2000 |
| JP | 2000-343964 | 12/2000 |
| JP | 2001-105899 | 4/2001 |
| JP | 2001-298901 | 10/2001 |
| JP | 2001-341685 | 12/2001 |
| JP | 2002-021601 | 1/2002 |
| JP | 2002-262404 | 9/2002 |
| JP | 2002-325412 | 11/2002 |
| JP | 2003-191761 | 7/2003 |
| JP | 2003-191883 | 7/2003 |
| JP | 2004-007919 | 1/2004 |
| JP | 2004-060498 | 2/2004 |
| JP | 2004-166369 | 10/2004 |
| JP | 2005-098251 | 4/2005 |
| WO | WO 00/43259 A1 | 7/2000 |
| WO | WO 2004/054836 | 7/2004 |

OTHER PUBLICATIONS

European Search Report for EP 06 01 2978, dated Dec. 20, 2006.
European Search Report for EP 06 01 2979, dated Oct. 3, 2006.
Non-final Office Action mailed Nov. 20, 2007 received in U.S. Appl. No. 11/426,244.
Non-final Office Action mailed May 22, 2008 received in U.S. Appl. No. 11/426,244.
European Search Report for EP 1 270 395, dated Mar. 23, 2005.
European Search Report for EP 07 00 3224, dated Apr. 24, 2007.
European Search Report for EP 07 00 5511 dated May 16, 2007.
Non-final Office Action mailed Oct. 15, 2007 received in U.S. Appl. No. 11/389,514.
Non-final Office Action mailed Jun. 9, 2008 received in U.S. Appl. No. 11/429,116.
Official Communication issued in corresponding European Patent Application No. 06005383, completed on Feb. 19, 2010.

* cited by examiner

DRIVE UNIT FOR HYBRID VEHICLE

CROSS-REFERENCE TO RELATED APPLICATIONS

The present application is based on and claims priority under 35 U.S.C. §119 to Japanese Patent Application No. 2005-076035, filed on Mar. 16, 2005, the entire contents of which is expressly incorporated by reference herein.

BACKGROUND OF THE INVENTION

1. Field of the Invention

This invention relates to a hybrid type drive unit including an engine and an electric motor both mounted on a vehicle (e.g., a hybrid type motorcycle) and selectively used for driving one or more drive wheels.

2. Description of the Related Art

Conventionally, vehicles such as motorcycles and automobiles typically have an engine for driving one or more wheels thereof. Recently, vehicle manufacturers and the consuming public have become more sensitive to environmental issues. It is thus desired to reduce carbon dioxide discharged from vehicles powered by an internal combustion engine or to reduce substances which give rise to the pollution of the environment. Accordingly, developments have been made in connection with vehicles having a drive motor which drives a wheel(s) together with an engine, i.e., so-called hybrid vehicles.

A hybrid vehicle can be a parallel type hybrid vehicle in which a drive wheel(s) is alternatively driven by an engine and a drive motor in response to, for example, a running condition of the vehicle or the amount of power remaining in a generator-charged battery. A hybrid vehicle can also be a series type hybrid vehicle in which an engine drives a generator, which in turn drives a drive motor for driving a drive wheel(s) using the electric power generated by the generator.

One example of a drive unit of the parallel type hybrid vehicle (particularly, four wheeled vehicles) is disclosed in Japanese Patent Publication No. JP 2000-343964.

The drive unit disclosed in JP 2000-343964 includes an engine, a generator, a power distributing mechanism for distributing the drive power of the engine between the generator and drive wheels, and an electric motor for driving the drive wheels with the electric power of the generator. In the vehicle of JP 2000-343964, the engine, the generator, the power distributing mechanism and the motor are coaxially arranged in a transverse direction of the vehicle.

More specifically, in the drive unit of JP 2000-343964, a power transmitting shaft coaxially disposed with the crankshaft is coupled with an end of the crankshaft through a clutch. The power transmitting shaft extends through the generator to define an axis of a planetary gear set of the power distributing mechanism, which includes a sun gear and a ring gear. The power transmitting shaft also extends through the motor. The power transmitting shaft thus can be the longest and the thinnest member in the structure of the drive unit. Additionally, the power transmitting shaft is connected to a planetary gear carrier supporting planetary gears for rotation, while the power transmitting shaft extends through the power distributing mechanism.

It is desired that such a conventional hybrid type drive unit be mounted on a motorcycle. However, space for mounting the drive unit on a motorcycle is limited to a portion of the vehicle body located between a front wheel and a rear wheel and below a seat. In addition, generally, a motorcycle has a narrower width than an automobile. The mounting space thus can be further limited. Accordingly, it is extremely difficult to provide the motorcycle with the drive unit that has the arrangement in which the engine, the generator, the power distributing mechanism and the motor are arranged coaxially and in series. As a result, no motorcycle has been developed in which the drive unit constructed as discussed above is efficiently mounted.

SUMMARY OF THE INVENTION

In view of the circumstances, an aspect of the present invention is to provide a drive unit that can be placed in a limited mount space of a motorcycle or the like without greatly protruding in the transverse direction even though the drive unit has a power distributing mechanism, and further to provide a hybrid vehicle or a motorcycle which incorporates the drive unit.

In accordance with one aspect of the invention, a drive unit for a hybrid vehicle is provided comprising an engine having a crankshaft, a generator configured to generate electric power via the operation of the engine, and an electric motor driven by the electric power of the generator, the electric motor configured to rotate a drive wheel. The drive unit also comprises a power distributing device configured to distribute the drive power generated by the engine between the generator and the drive wheel. The generator, the motor and the power distributing device are disposed on a shaft extending generally parallel to the crankshaft of the engine.

The generator, the motor and the power distributing device, in one example, are not juxtaposed with the crankshaft, because the generator, the motor and the power distributing device are disposed on the single different shaft which is different from the crankshaft of the engine and extends parallel to the crankshaft. That is, the structure including the engine, the generator, the motor, and the power distributing device is not elongated and, thus, can be relatively compact. Thus, with the crankshaft extending in the transverse direction, the generator, the engine and the motor can be mounted without protruding in the transverse direction. The drive unit thus can be suitably and easily mounted on a vehicle, e.g., a motorcycle, which only has such a limited space.

DETAILED DESCRIPTION OF THE PREFERRED EMBODIMENT

As used herein, a "drive unit" refers to an assembled unit, which may have a plurality of components, all of which may or may not be held in a common housing. Additionally, as used in the embodiments herein, the terms "front," "forward," "rear," "rearward," "left," "right," "top," "upper," "bottom" and "lower" are defined from the perspective of user riding the hybrid vehicle.

Figure 1:
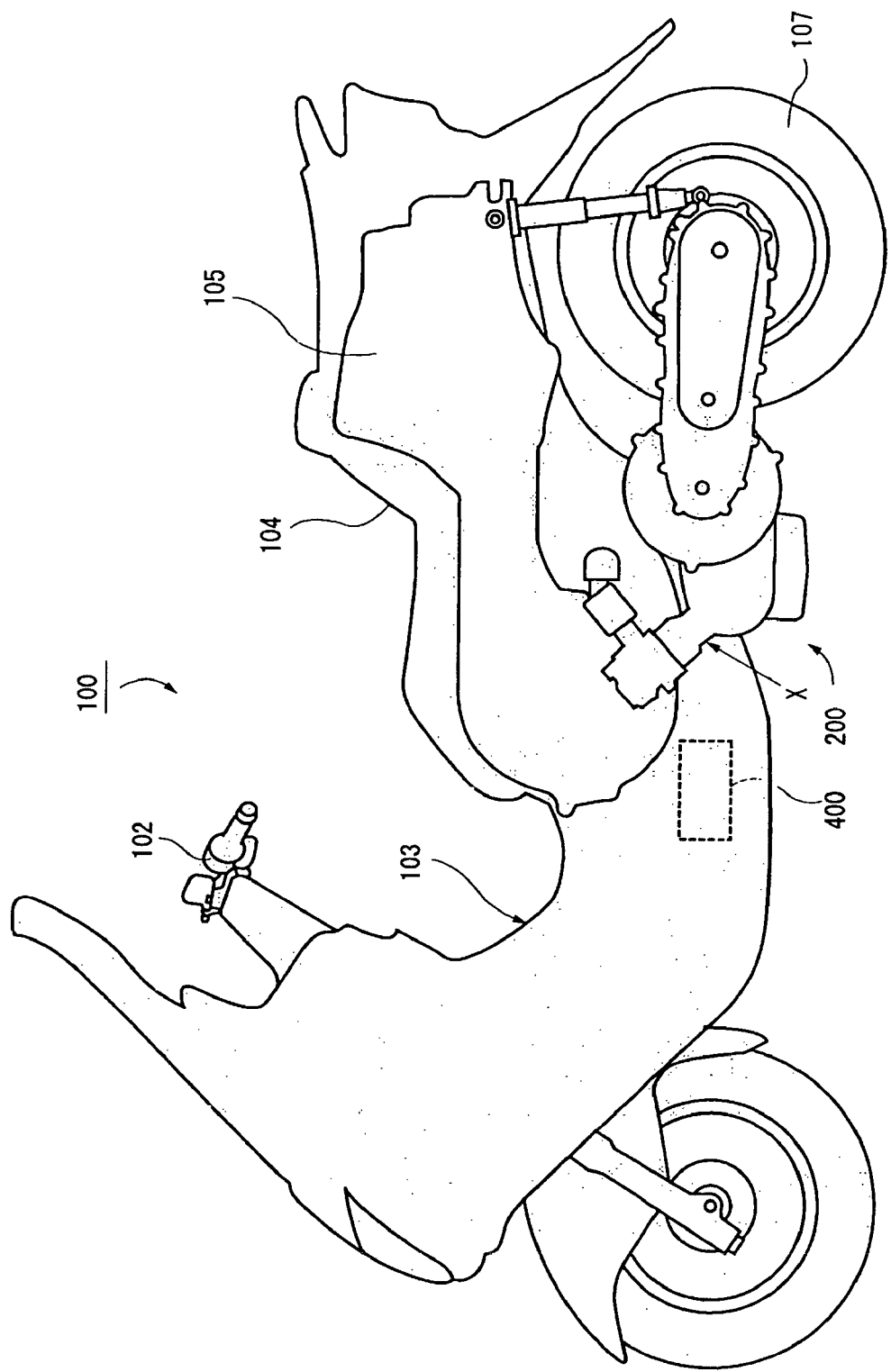
FIG. 1 is a left side elevational schematic view of a scooter type hybrid motorcycle on which one embodiment of a drive unit for a hybrid vehicle is mounted.

FIG. 1 is a left side elevational view of a scooter type hybrid motorcycle, which is an example of a hybrid vehicle on which the drive unit for a hybrid vehicle according to an embodiment of this invention is mounted.

The scooter type motorcycle of FIG. 1 incorporates a series/parallel hybrid mechanism in which either one of an engine and an electric motor, both of which are power sources, individually drives a wheel, or both of the engine and the motor are combined to drive the wheel. More specifically, in the hybrid vehicle (called "scooter type motorcycle" below), a power dividing mechanism divides the engine power. A part of the divided power is used for directly driving the wheel, while the other part thereof is used for generating electric power. The usage ratio is controllable without any restraint.

The scooter type motorcycle 100 of FIG. 1 has a vehicle body 103 supporting a handle bar 102 for pivotal movement on a front side of the vehicle body 103. In the illustrated embodiment, a rear portion of the vehicle body 103 has a tandem seat 104 and a trunk space 105 disposed below the seat 104. In a preferred embodiment, a hybrid type drive unit 200 is positioned below the trunk space 105.

Figure 2:
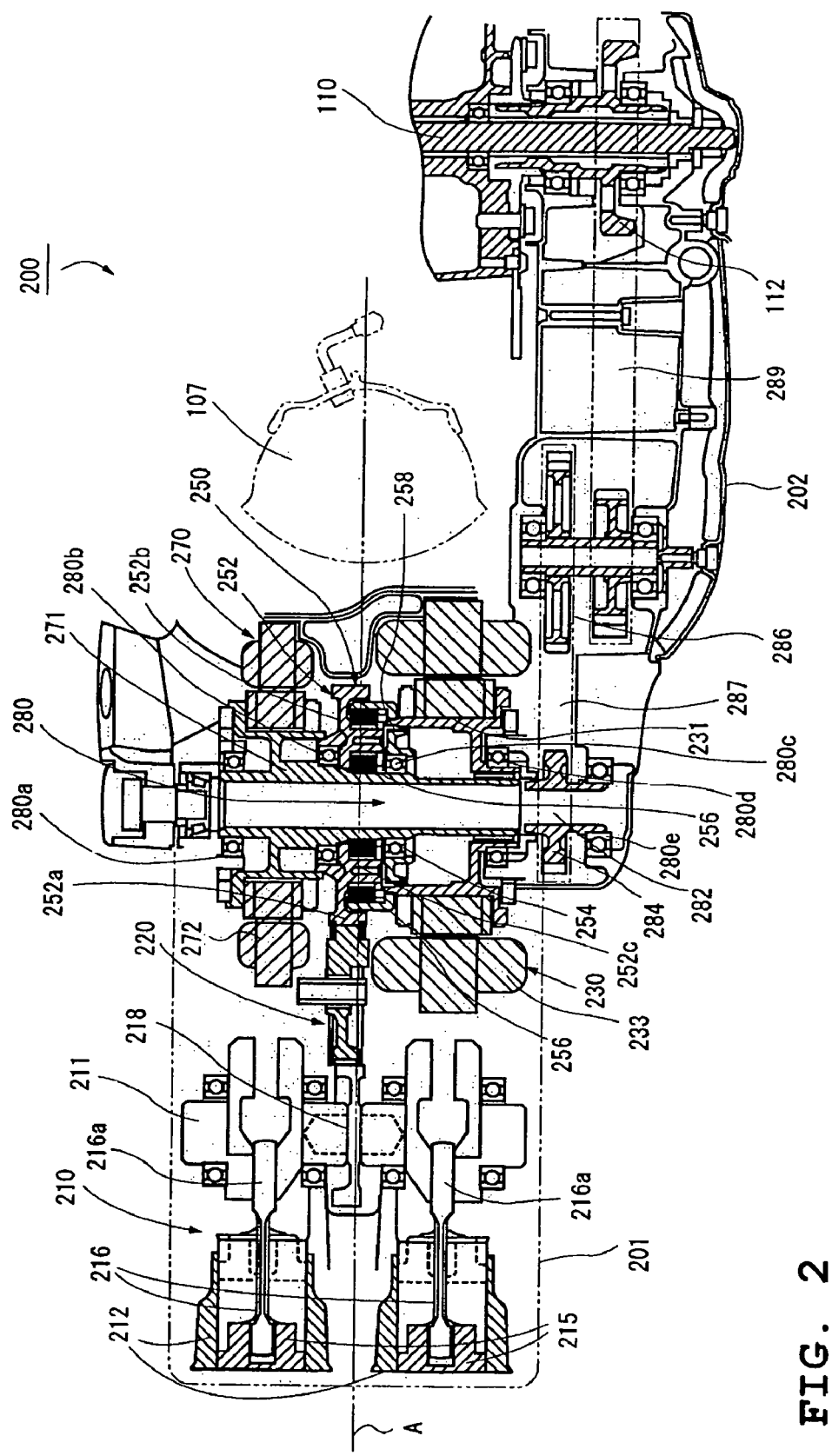
FIG. 2 is a partial, plan cross sectional view of the drive unit mounted on the scooter type motorcycle of FIG. 1, schematically showing the structure of the drive unit.

FIG. 2 is a partial, plan cross-sectional view of the drive unit 200 mounted on the scooter type motorcycle 100 of FIG. 1, which is one example of the hybrid vehicle, schematically showing the structure of the drive unit 200.

As shown in FIG. 2, the drive unit 200 includes an engine 210, an electric motor 230, a power distributing device 250 and a generator 270. The motor 230, the power distributing device 250 and the generator 270 are preferably aligned on a power transmitting shaft 280, which extends generally parallel to a crankshaft 211 of the engine 210 and is disposed rearward of the crankshaft 211. Additionally, respective bearings 280a-280e in a housing 201 journal the power transmitting shaft 280 for rotation.

In the illustrated embodiment, the engine 210 is a two-cylinder engine, and is disposed below the trunk space 105 of the scooter type motorcycle 100. In a plan view, respective axes of two cylinders 212 of the engine 210 extend generally parallel to a vehicle longitudinal center axis A (corresponding to a perpendicular plane extending through a center of a rear wheel in a transverse direction), and the axes are symmetrically positioned relative to the plane including the center axis A.

The engine 210 preferably has equal ignition intervals (e.g., crank angle 720 degrees per number of cylinders). Torque fluctuations of the crankshaft 211 of the engine 210 thus can be reduced. However, the number of cylinders and the type of the engine are not limited to this embodiment. For example, the engine can have a single cylinder, or three or more cylinders. Also, a V-type engine, a horizontal opposed type engine, etc. can be used and is not limited to the in-line type engine.

A piston 215 disposed in each cylinder 212 is connected to the crankshaft 211 extending generally in the transverse direction through a connecting rod 216, where the rod body extends in a fore to aft direction of the vehicle. Because of this arrangement, the crankshaft 211 rotates together with the reciprocal movement of the respective pistons 215 during operation of the engine 210. Also, under a standstill condition of the engine 210, the respective pistons 215 can start moving reciprocally as the crankshaft 211 is rotated as the engine 210 starts operating.

In the illustrated embodiment, the crankshaft 211 has a crank gear (rotary member) 218 positioned between large ends 216a of respective connecting rods 216 connected to the two pistons 215 to transmit the rotational force of the crankshaft 211 to the power transmitting shaft 280 of the power distributing device 250. The crank gear 218 is preferably placed generally at a center of the crankshaft 211 in its axial direction.

Figure 3:
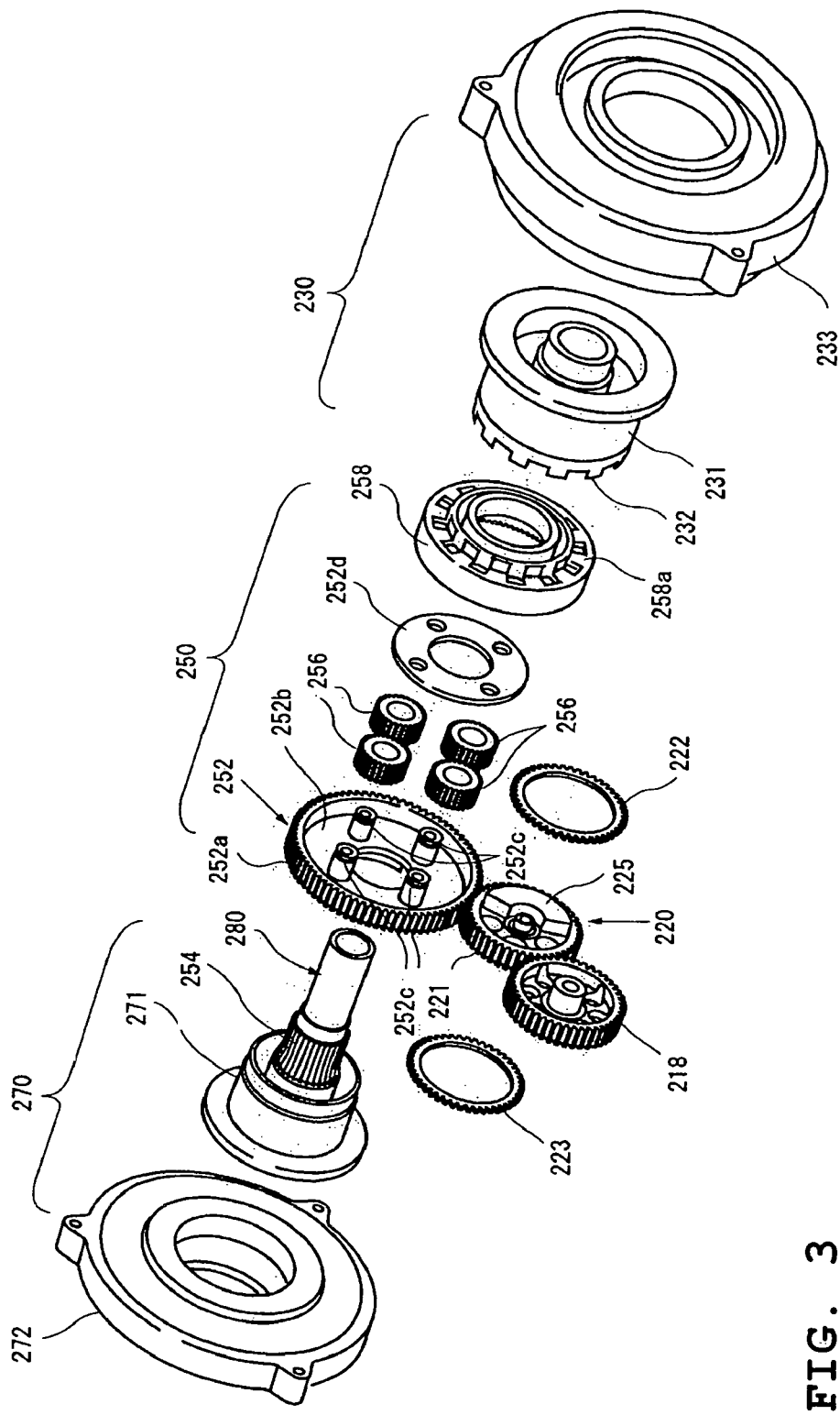
FIG. 3 is a perspective exploded view of the drive unit of FIG. 2.
Figure 4:
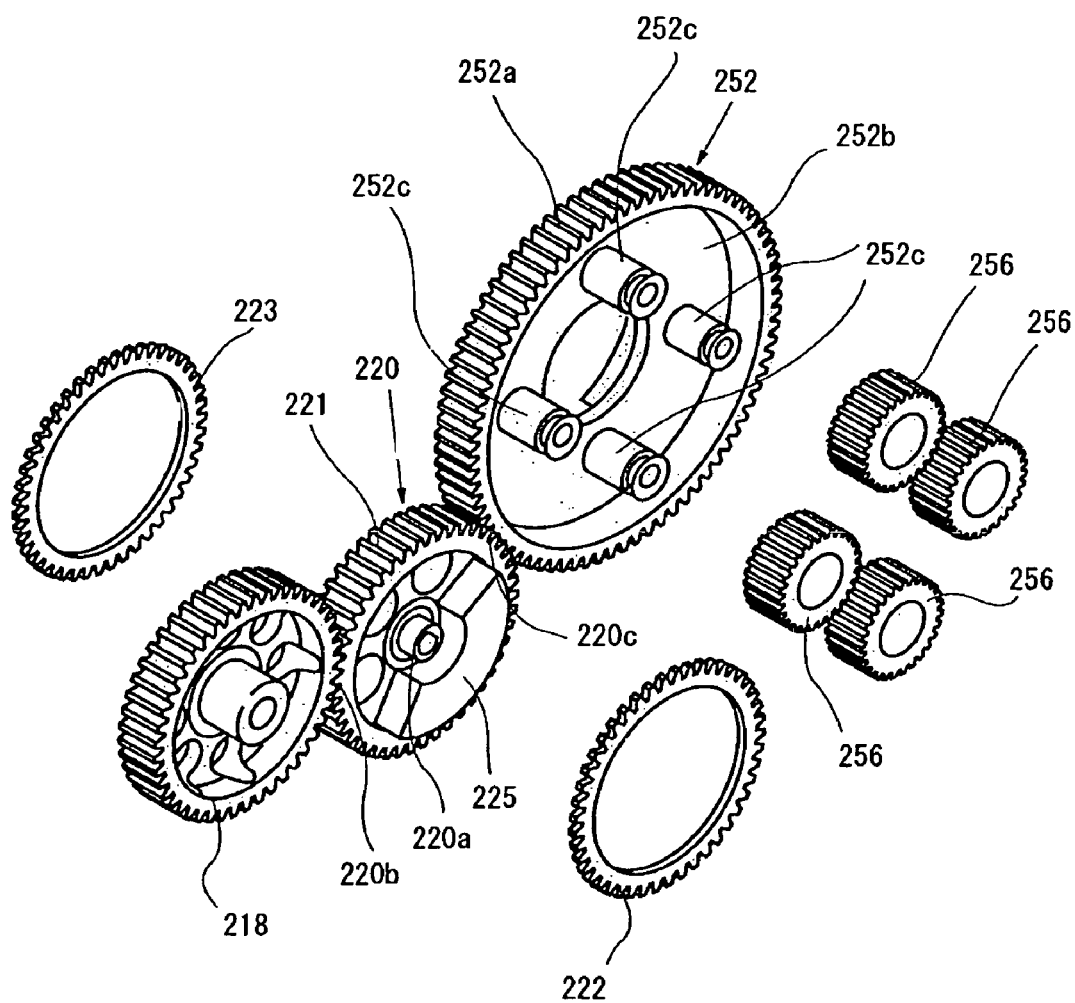
FIG. 4 is an enlarged perspective view of one embodiment of an engine power transmitting line that transmits engine power to a power transmitting shaft from a crankshaft.

FIG. 3 is a perspective exploded view of the drive unit 200 of FIG. 2. FIG. 4 is an enlarged perspective view of an engine power transmitting line that transmits the engine power to the power transmitting shaft 280 from the crankshaft 211 in FIG. 3.

As shown in FIGS. 2 through 4, the crank gear 218 meshingly engages with an intermediate gear 220 (transmitting section) which rotates about an axis extending parallel to the axis of the crankshaft 211. The intermediate gear 220 engages with gear teeth 252a formed on an outer circumferential portion of a planetary gear carrier 252 of the power distributing device 250. The intermediate gear 220, together with the crank gear 218, functions as a power transmitting section that takes the engine power out generally at the center of the crankshaft 211 in the transverse direction and transmits the power to the power distributing device 250.

The intermediate gear 220, together with the crank gear 218, forms the engine power transmitting line that transmits the power of the engine 210 to the power distributing device 250. As shown in FIG. 2, the engine power transmitting line formed with the crank gear 218, the intermediate gear 220 and the planetary gear carrier 252 are offset from the vehicle center axis A opposite to a location where an arm section 202 of the drive unit 200 is positioned.

Within the housing 201 (see FIG. 2) of the drive unit 200, the intermediate gear 220 is positioned to be rotatable between the crankshaft 211 and the power transmitting shaft 280 and about an axis of an intermediate gear shaft 220a (see FIG. 4) extending parallel to both of the crankshaft 211 and the power transmitting shaft 280.

The intermediate gear shaft 220a is placed below both of the crankshaft 211 and the power transmitting shaft 280. The intermediate gear 220 thus engages with the crank gear 218 at a front upper portion 220b of its outer circumferential portion and also engages with the gear teeth 252a of the outer circumferential portion of the planetary gear carrier 252 at a rear upper portion 220c of its outer circumferential portion.

More specifically, the intermediate gear 220 has a main gear section 221 rotatable about the axis of the intermediate gear shaft 220a and a pair of side gear sections 222 and 223 attached to the main gear section 221 on respective lateral sides thereof and rotatable in their circumferential directions.

The main gear section 221 preferably engages with the crank gear 218 and the planetary gear carrier 252 at the front upper portion of the outer circumferential portion and at the rear upper portion thereof, respectively.

The respective side gear sections 222 and 223 are positioned coaxially with the main gear section 221 for rotation. Each side gear section 222, 223 preferably has an outer diameter that is equal to that of the main gear section 221. An outer circumferential portion of each side gear section 222, 223 has a different number of teeth than those of the main gear section 221. In the illustrated embodiment, the number of the teeth of the side gear section 222 is less than the number of the teeth of the main gear section 221, while the number of the teeth of the side gear section 223 is greater than the number of the teeth of the main gear section 221.

Figure 5:
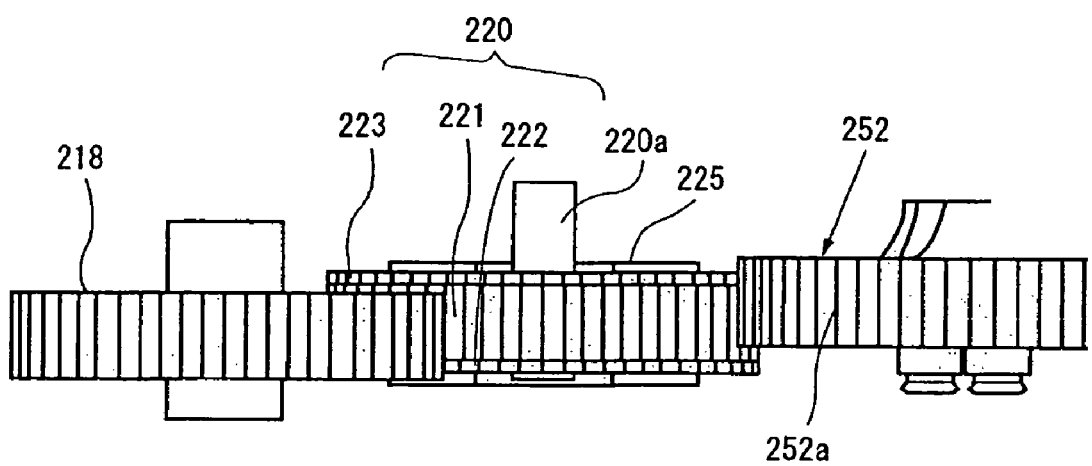
FIG. 5 is a plan schematic view of the engine power transmitting line.

FIG. 5 is a plan view of the engine power transmitting line including the intermediate gear 220. As shown in FIG. 5, in connection with the intermediate gear 220, the main gear section 221 and the side gear section 222 together engage with the crank gear 218, while the main gear section 221 and the other side gear section 223 together engage with the planetary gear carrier 252. Because of the structure of the main gear section 221 and the side gear section 222, the backlash between the crank gear 218 and the intermediate gear 220 is adjusted. Also, because of the structure of the main gear section 221 and the side gear section 223, the backlash between the intermediate gear 220 and the planetary gear carrier 252 is adjusted. Thus, the structure of the intermediate gear 220 advantageously inhibits the occurrence of backlash between the crank gear 218 and the intermediate gear 220 and between the intermediate gear 220 and the planetary gear carrier 252.

The main gear section 221 preferably has balance weights 225 in the inner space thereof to make the weight allotment of the section 221 disproportionate. The balance weights 225 preferably cancel the reciprocal inertia generated by the movement of the pistons 215 of the engine 210. More specifically, each balance weight 225 is offset from an axis of the main gear section 221, i.e., from the intermediate gear shaft 220a. In this embodiment, each balance weight 225 is positioned at a location most spaced apart from the pistons 215 when the pistons 215 are positioned at the top dead center of the respective cylinders. Additionally, a counter weight (not shown) of the crankshaft 211 is also positioned at a location most spaced apart from the pistons 215 when the pistons 215 are positioned at the top dead center.

In addition, each balance weight 225 has a portion extending in the inner space of the main gear section 221 along a part of the outer circumference and protruding in the transverse direction. Each portion protruding in the transverse direction and extending along the part of the outer circumference defines a portion of a guide which guides the associated side gear section 222 or 223 when the section 222 or 223 rotates about the axis of the intermediate gear shaft 220a. That is, each of the circular side gear sections 222 and 223 fits on the associated portion, which extends along the outer circumference of the main gear section 221, for rotation.

The crankshaft 211 is connected to the power distributing device 250 through the intermediate gear 220 so that the rotational force of the crankshaft 211 is transmitted to the power distributing device 250. Conversely, the drive force of the power distributing device 250 can be transmitted to the crankshaft 211 through the intermediate gear 220.

In this embodiment, the intermediate gear 220 is provided as an intermediate transmitting member that transmits the engine power from the crankshaft 211 to the planetary gear carrier 252 of the power distributing device 250. However, the intermediate transmitting member is not limited to the intermediate gear 220. For instance, a chain or a belt such as a V-shaped belt or a toothed belt can replace the intermediate gear 220 to transmit the rotational force of the crankshaft 211 to the power distributing device 250.

The power distributing device 250 to which the engine power is transmitted from an outer circumference of the device 250 through the intermediate gear 220 is disposed on the power transmitting shaft 280 between the motor 230 and the generator 270. As shown in FIGS. 2 and 3, the power distributing device 250 has, other than the planetary gear carrier 252, a sun gear 254, planetary gears 256 and a ring gear 258. Those gears 254, 256, 258 have their own shafts extending parallel to each other and are rotatable about axes of the respective shafts together with the planetary gear carrier 252.

Figure 6:
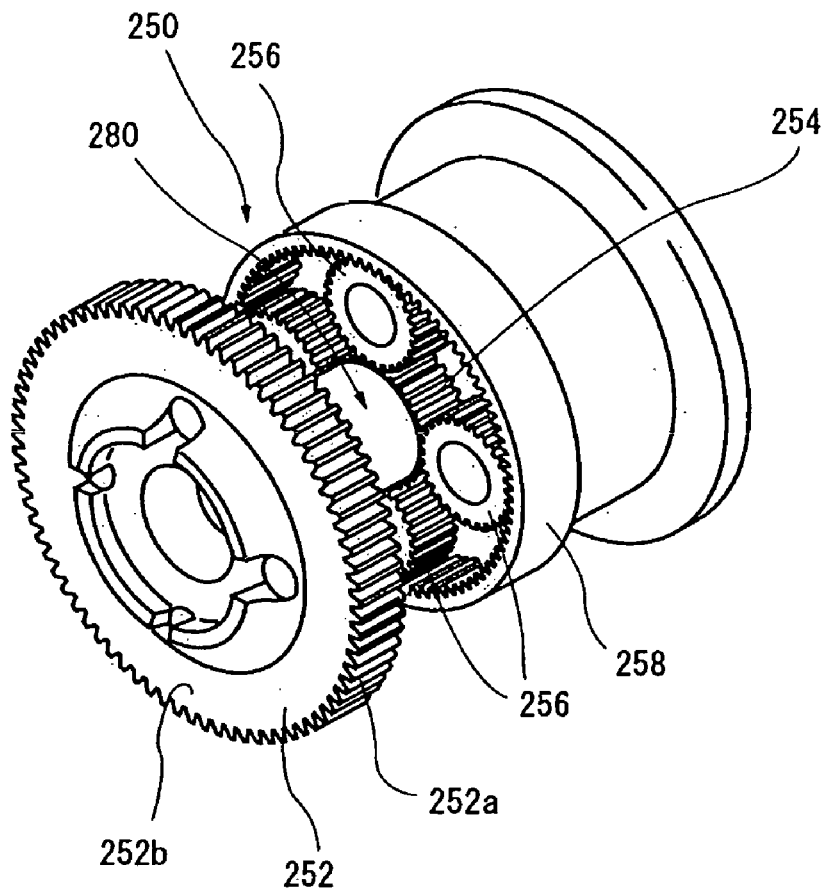
FIG. 6 is a perspective exploded view of one embodiment of a power distributing device.
Figure 7:
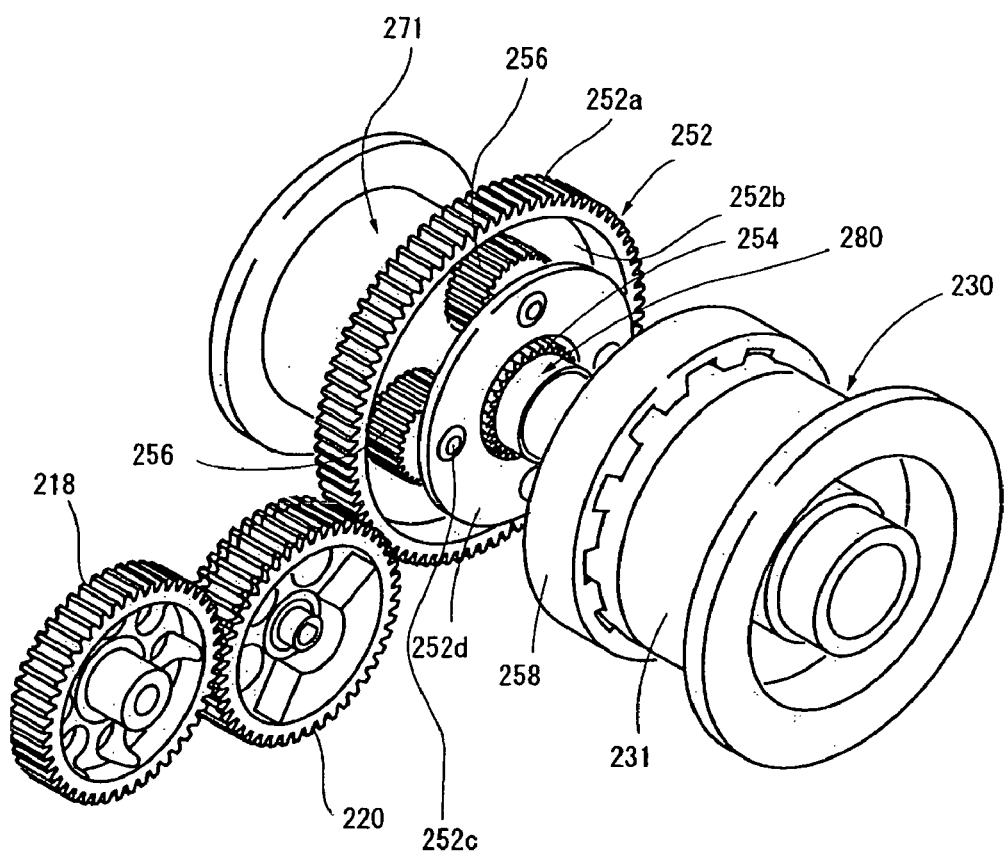
FIG. 7 is a perspective exploded view of the power distributing device.

FIGS. 6 and 7 are perspective exploded views of the power distributing device 250. More specifically, FIG. 6 is an exploded view of the power distributing device 250 without the planetary gear carrier 252, showing the major part of the device 250 viewed from the generator side (i.e., the right side of the vehicle), while FIG. 7 is an exploded view of the power distributing device 250 in a state that the ring gear 258 is removed from the sun gear 254, showing the device 250 viewed from the motor side (i.e., the left side of the vehicle).

The power distributing device 250 preferably properly distributes the drive power transmitted from the engine 210 between the vehicle driving force and the generator driving force. The vehicle driving force directly drives the rear wheel 107 through a rear wheel drive force transmitting line located in the interior of the arm section 202. The generator driving force drives the generation of electric power by the generator 270. In addition, the power distributing device 250 can transmit the drive force of the motor 230 to the crankshaft 211.

More specifically, in the power distributing device 250, the power of the engine 210 is transmitted to the gear teeth 252a of the outer circumferential portion of the planetary gear carrier 252 through the intermediate gear 220. The outer circumferential portion having the gear teeth 252a has a cylindrical shape protruding on one side, i.e., toward the motor 230 from an outer periphery of a circular carrier body 252b. That is, the gear teeth 252a overhangs relative to the carrier body 252b.

The carrier body 252b adjoins the sun gear 254 formed on an outer circumferential surface of the power transmitting shaft 280, and is positioned on the power transmitting shaft 280 for rotation about an axis of the power transmitting shaft 280.

The planetary gear carrier 252 has a plurality of planetary pins 252c (see FIGS. 2 through 4) protruding from one side of the carrier body 252b and extending parallel to the power transmitting shaft 280 that is inserted into the carrier body 252b. The planetary pins 252c are positioned inside of the outer circumferential portion of the carrier body 252b that has the gear teeth 252a, and are placed coaxially about the axis of the power transmitting shaft 280 so as to preferably be spaced apart from each other at equal intervals.

The planetary pins 252c are positioned around the sun gear 254 to journal the planetary gears 256 engaging with the sun gear 254 for rotation (see FIGS. 2 and 7).

A support member 252d is attached to distal ends of the respective planetary pins 252c that are inserted into the associated planetary gears 256 to prevent the planetary gears 256 from coming off from the respective planetary pins 252c (see FIG. 7).

The planetary gears 256 preferably revolve around the sun gear 254 while rotating. The sun gear 254 is formed on a part of the outer circumference of the power transmitting shaft 280. The power transmitting shaft 280 is preferably formed such that a shaft portion of a rotor 271 of the generator 270 disposed on the side opposite to the motor 230 relative to the power distributing device 250 is axially elongated in the transverse direction. As shown in FIG. 2, the power transmitting shaft 280 is inserted from one side of the vehicle (i.e., right side in this embodiment). A distal end of the shaft 280 on the other side of the vehicle is inserted into the rotor 231 of the motor 230 for rotation.

Because the sun gear 254 is unitarily formed with the power transmitting shaft 280, that is the extended shaft portion of the rotor 271 of the generator 270, the rotor 271 rotates together with the rotation of the sun gear 254. In other words, the generator 270 rotates together with the rotation of the sun gear 254. Conversely, the sun gear 254 rotates together with the rotation of the generator 270.

As shown in FIGS. 2, 3 and 6, the ring gear 258 is disposed along the outer circumferences of the respective planetary gears 256 so that the inner circumferential surface of the ring gear 258 engages with the respective planetary gears 256.

The ring gear 258 is preferably coupled to the rotor 231 of the motor 230, as shown, for example, in FIG. 7. The rotor 231 thus rotates about an axis of the rotor 231 together with the ring gear 258, and both the rotor 231 and the ring gear 258 rotate about the axis of the power transmitting shaft 280 to generate the vehicle thrusting force.

Figure 8:
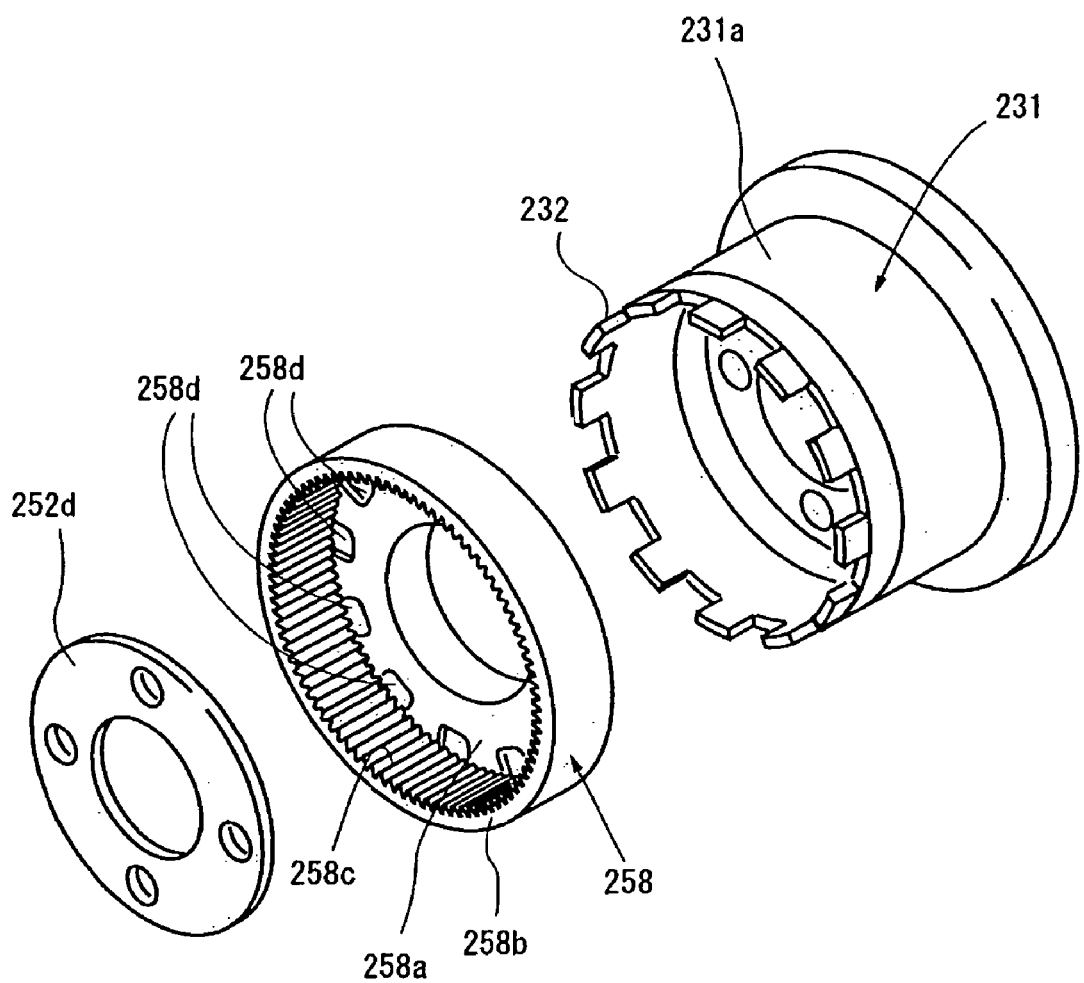
FIG. 8 is a perspective exploded view of a ring gear and a rotor of one embodiment of a motor, indicating a coupling relationship between the ring gear and the rotor of the motor.

FIG. 8 is a perspective exploded view that indicates a coupling relationship between the ring gear 258 and the rotor 231 of the motor 230. As shown in FIG. 8, the ring gear 258 has a circular body 258a and a cylindrical outer circumferential rib 258b. The circular body 258a has a central aperture into which the power transmitting shaft 280 (see FIGS. 2, 3, 6 and 7) is inserted. In a preferred embodiment, the outer circumferential rib 258b extends generally perpendicular relative to the circular body 258a from the outer periphery of the circular body 258a.

The outer circumferential rib 258b has an inner circumferential surface forming gear teeth 258c that engage the planetary gears 256 (see FIGS. 2 through 4, 6 and 7).

Preferably, the outer circumferential rib 258b surrounds the planetary gears 256 while the ring gear 258 is disposed inside of the cylindrical outer circumferential portion of the planetary gear carrier 252. As shown in FIG. 7, the gear carrier 252 has gear teeth 252a on its outer circumferential surface. That is, the outer circumferential portion of the planetary gear carrier 252 surrounds the ring gear 258. In the interior of the outer circumferential portion of the planetary gear carrier 252, the outer circumferential rib 258b is positioned between the gear teeth 252a of the planetary gear carrier 252 and the planetary gears 256, which are journaled by the planetary gear carrier 252 so that the gear teeth 258c formed on an inner circumferential surface of the rib 258b engage the planetary gears 256.

In other words, as shown in FIG. 2, the ring gear 258 is positioned at the same axial location as the planetary gear carrier 252 along the power transmitting shaft 280. Thus, in the illustrated embodiment, the planetary gear carrier 252 and the ring gear 258 are arranged so that they overlap with each other. This arrangement is advantageously compact, so that the space occupied by the planetary gear carrier 252 and the ring gear 258 can be smaller in the transverse direction of the vehicle, in comparison with a structure in which both the gear carrier 252 and the ring gear 258 are juxtaposed on the power transmitting shaft 280 without overlapping each other.

As best seen in FIGS. 3 and 8, the outer periphery of the circular body 258a of the ring gear 258 has a plurality of openings 258d formed circumferentially along the periphery of the circular body 258a. The openings 258d extend axially through the circular body 258a. With continued reference to FIG. 8, the rotor 231 of the motor 230 has a plurality of projections 232. The projections 232 are preferably sized so as to be inserted into the openings 258d of the ring gear 258 through a surface (left surface relative to the vehicle) of the circular body 258a on an opposite side of the circular body 258a from the circumferential rib 258b.

In this power distributing device 250, when the planetary gear carrier 252 is rotated by the power coming from the crankshaft 211, the planetary pins 252c unitarily formed with the planetary gear carrier 252 rotate about the axis of the power transmitting shaft 280. Together with the rotation of the planetary pins 252c, the planetary gears 256 rotate to revolve around the sun gear 254. The sun gear 254 and the ring gear 258 in turn rotate with the rotation of the planetary gears 256 to which they are engaged.

Because the sun gear 254 is unitarily formed with the rotor 271 of the generator 270, the rotor 271 rotates together with the sun gear 254. Rotation of the rotor 271, which is part of the power transmitting shaft 280, drives the generator 270 to generate electric power.

The generator 270 generates electric power and supplies the generated power to a battery 400 (see FIG. 1) and the motor 230. In one preferred embodiment, the generator 270 can function as a motor operated by the power of the battery in addition to functioning as the generator. For example, in one embodiment, the generator can operate as a starter motor that starts the engine 210 when a charge amount of the battery 400 is less than a preset amount. In another embodiment, the motor 230 can function as a motor that generates resistance force restraining the rotation of the axle 110 when the motorcycle 100 is decelerated or braked.

The battery 400 (see FIG. 1) is preferably electrically connected to the generator 270, which in one embodiment is driven by the engine 210. In a preferred embodiment, the battery 400 supplies electric power to the motor 230 to operate the motor 230, as well as accumulates the power generated by the motor 230 and the generator 270.

A rotational shaft of the motor 230 and the power transmitting shaft 280 preferably have a common axis. In the illustrated embodiment, the motor 230 is juxtaposed with the generator 270 and the power distributing device 250 in the transverse direction to be positioned in front of the rear wheel 107.

The motor 230 has a stator 233 (see FIGS. 2 and 3) fixed inside of the housing 201 (see FIG. 2) of the drive unit 200. The rotor 231 is disposed at least partially inside of the stator 233 and is rotatable about the axis of the power transmitting shaft 280.

In the illustrated embodiment, the rotor 231 has a cylindrical rotor body 231a. The multiple projections 232, which are inserted into the respective openings of the ring gear 258, extend from an open end of the rotor body 231a. Because the projections 232 can be inserted into the openings 258d of the ring gear 258, the ring gear 258 and the rotor 231 are coupleable together.

In this structure, when the rotor 231 rotates about the axis of the power transmitting shaft 280 that extends therethrough, the ring gear 258 also rotates about the axis of the power transmitting shaft 280. The rotor 231 is coupled with a sprocket 284 (see FIG. 2) provided on the left side of the vehicle to transmit the rotational force to the rear wheel 107. That is, the drive force of the motor 230 caused by the electric power of the battery 400 is transmitted to the rear wheel 107 through the sprocket 284, which rotates together with the rotor 231. Similarly, the power of the engine 210 is transmitted to the rear wheel 107 through the rotor 231 rotating with the rotation of the ring gear 258 and the sprocket 284.

In one preferred embodiment, the sprocket 284 reduces the power of the engine or the drive force of the motor through the motor 230 (specifically, the rotor 231) positioned on the one end of the power transmitting shaft 280 to properly reduce the rotational speed before the power or the drive force is transmitted to the rear wheel 107. Additionally, the sprocket 284 is placed at a position 282 next to the one end of the power transmitting shaft 280 so as to be rotatable about the axis of the power transmitting shaft 280.

A chain 287 is wound around the sprocket 284 and a sprocket of a speed reduction gear section 286 disposed rearward of the sprocket 284. Another chain 289 is wound around another sprocket of the speed reduction gear section 286 and a sprocket 112 of the axle 110 disposed rearward of the sprocket of the speed reduction gear section 286. The drive force transmitted to the speed reduction gear section 286 through the chain 287 is thus transmitted to the axle 110 to drive the rear wheel 107.

The sprocket 284, the chain 287, the speed reduction gear section 286, the sprocket 112, the chain 289 and the sprocket 112 of the axle 110 together form the rear wheel drive force transmitting line to rotate the rear wheel 107 or drive wheel. The rear wheel drive force transmitting line is preferably arranged in the interior of the cantilevered arm section 202 of the drive unit 200, which is positioned on the left side of the rear wheel 107 (see FIG. 2). However, the rear wheel force transmitting line can be arranged in other suitable ways.

As shown in FIG. 2, the rear wheel drive force transmitting line is arranged substantially adjacent to the motor 230. Thus, a distance between the motor 230 and the sprocket 284 of the rear wheel drive force transmitting line is short. The rotational force of the motor 230 thus can advantageously be directly transmitted to the sprocket 284.

Accordingly, the drive unit 200 does not need any additional linkage members linking the motor 230 and the sprocket 284 to each other. Because the rotor 231 is directly connected to the sprocket 284 in the illustrated embodiment, the effect of torsional vibrations caused by the rotational torque of the motor 230 on the drive unit 200 is inhibited.

As shown in FIG. 2, the rear wheel drive force transmitting line is positioned on the side opposite to the engine power transmitting line relative to the vehicle center axis A. That is, the engine power transmitting line is offset to the opposite side of the arm section 202 of the drive unit 200 relative to the center line A.

In the scooter type motorcycle 100 having the drive unit 200 as thus constructed, the rear wheel 107 is driven by at least the drive force of the motor 230, or by both the power of the engine 210 provided through the power distributing device 250 and the drive force of the motor 230.

That is, the power of the engine 210 is input to the power distributing device 250 via the interaction between the outer circumference of the planetary gear carrier 252 and the crank gear 218 via the intermediate gear 220, both the crank gear 218 and the intermediate gear 220 forming the engine power transmitting line. The power input to the power distributing device 250 is transmitted to the rotor 231 by the rotation of the ring gear 258, following the rotation of the planetary gears 252, and is further transmitted from the rotor 231 to the sprocket 284 of the rear wheel drive power transmitting line. The power is then transmitted to the rear wheel 107 through the rear wheel drive force transmitting line to drive the rear wheel 107.

The operations of the engine 210 and the motor 230, i.e., the operation of the drive unit 200, are preferably determined in accordance with the running conditions of the scooter type motorcycle 100 or the charge amount or level of the battery 400 (see FIG. 1) available to provide electric power to operate the motor 230.

First, the operations of the drive unit 200 under a condition that the charge amount of the battery 400 is greater than a preset amount will be described in correspondence to each running state of the scooter type motorcycle 100.

A. A Starting State and a Light Load Running State

In a starting state and a light load running state, the scooter type motorcycle 100 starts and preferably runs using only the drive force of the motor 230. Because the charge amount of the battery 400 is greater than the preset amount in these states, the generator 270 does not need to generate electric power. Accordingly, the engine 210 is at standstill.

The operation of the drive unit 200 in these states includes the operation of the motor 230, which rotates the rotor 231. The sprocket 284 rotates with the rotation of the rotor 231. Together with the rotation of the sprocket 284, the speed reduction gear section 286 rotates via the chain 287, and the rear wheel 107 rotates via the chain 289 and the axle 110.

The ring gear 258 rotates together with the rotation of the rotor 231 of the motor 230. When the ring gear 258 rotates, the respective planetary gears 256 rotate in the same direction as the ring gear 258. Together with the rotation of the planetary gears 256, the sun gear 254 rotates in the reverse direction relative to the planetary gears 256.

The rotation of the sun gear 254 makes the rotor 271 of the generator 270 rotate. Under this condition, the sun gear 254 preferably rotates at a speed corresponding to the speed of the ring gear 258, which rotates together with the sun gear 254. This is to keep the engine 210 under the not-cranking condition by the rotation of the ring gear 258 following the rotation of the motor 230. The term "cranking" means the state in which the rotational force is given to the crankshaft from outside to make the pistons 215 move reciprocally.

More specifically, when the motor 230 rotates, i.e., the ring gear 258 rotates, the respective planetary gears 256 rotate and also the planetary pins 252c revolve around the sun gear 254. This revolution (corresponding to the rotation of the planetary gears) is transmitted to the crankshaft 211 through the planetary pins 252c, specifically, the planetary gear carrier 252. The crankshaft 211 thus can rotate to drive the pistons 215 through the connecting rods 216. In order to prevent this situation from occurring, the rotor 271 of the generator 270, i.e., the sun gear 254, is rotated synchronously with the motor 230 (i.e., the ring gear 258) at the same rotational speed. This is achieved when the speeds of the rotor 271 and the sun gear 254 are synchronized with the speed of the motor 230 by which the speed of the generator 270 is controlled.

As thus described, because of the synchronized rotation of the sun gear 254 and the ring gear 258, the planetary gear carrier 252 itself does not rotate. Thus, the rotational force is not transmitted to the crankshaft 211, and the cranking of the engine 210 is prevented in the starting state and the light load running state.

B. A Normal Running State

In a normal running state, the scooter type motorcycle 100 preferably runs using the power of the engine 210 and the drive force of the motor 230, so that the vehicle can run in an operational range where the engine 210 has a suitable fuel consumption rate. Specifically, the power distributing device 250 properly distributes the power of the engine 210 between the vehicle driving force that directly drives the rear wheel 107 and the generator driving force that causes the generator 270 generate electric power. That is, the engine 210 outputs both of the vehicle driving force and the drive force of the motor 230 made by the electric power generated by the generator 270 using the generator driving force.

During the operation of the drive unit 200 in this state, the power of the engine 210 rotates the planetary gear carrier 252 through the intermediate gear 220. That is, because of the rotation of the crankshaft 211 of the engine 210, the respective planetary pins 252c revolve about the axis of the power transmitting shaft 280. Together with the revolution of the planetary pins 252c, the respective planetary gears 256 revolve about the axis of the power transmitting shaft 280 and around the sun gear 254 while rotating around the associated planetary pins 252c.

Together with the rotation of the planetary gears 256, the ring gear 258 rotates. Together with the rotation of the ring gear 258, the rotor 231 of the motor 230 rotates to drive the sprocket 284. The rotation of the sprocket 284 is transmitted to the axle 110 through the chain 287, the speed reduction gear section 286 and the chain 289 to rotate the rear wheel 107.

On the other hand, because of the rotation of the planetary gears 256, the sun gear 254 engaging with the respective planetary gears 256 rotate in the reverse direction relative to the planetary gears 256. Together with the rotation of the sun gear 254, the rotor 271 rotates.

Because of the rotation of the rotor 271, the generator 270 generates electric power. The electric power of the generator 270 is supplied to the motor 230 for its rotation. The motor 230 thus rotates to drive the rear wheel 107 through the rear wheel drive force transmitting line including the sprocket 284.

C. A Special Running State Such as an Acceleration State or a Hill Climbing State which Needs a Higher Output In a special running state, such as an acceleration state or a hill climbing state, which needs a higher output, the scooter type motorcycle 100 preferably increases the speed of the engine 210 and supplies the electric power accumulated in the battery 400 together with the generated power to the motor 230, in addition to the operations discussed above in the "normal running state". The motor 230, upon receiving such electric power, outputs more powerful drive force. That is, in addition to the power of the engine 210, the drive force of the motor 230 rotates the rotor 231. The rotational force of the rotor 231 is transmitted to the rear wheel drive force transmitting line to rotate the rear wheel 107.

D. A Deceleration State and a Braking State

In a deceleration state and a braking state, the scooter type motorcycle 100 preferably uses the engine brake action of the engine 210. That is, the rotation of the axle 110 of the rear wheel 107 is transmitted to the engine 210 through the engine power transmitting line, the rotor 231 of the motor 230 and the power distributing device 250 to reciprocally move the pistons 215 of the engine 210. Under this condition, the friction and the compression resistance force generated together with the reciprocal movement of the pistons 215, i.e., the so-called engine brake, acts on the engine 210.

More specifically, in the generator 270, together with the rotation of the rotor 231 of the engine 210, the rotational speed of the rotor 271 temporarily increases to the extent in which over-rotation does not occur to increase the speed of the engine 210 through the power distributing device 250. The engine 210 having the increased engine speed generates the engine brake action; thereby, the scooter type motorcycle 100 decelerates or brakes.

Next, the operations of the drive unit 200 under a condition that the charge amount of the battery 400 is less than the preset amount will be described in correspondence to each running state of the scooter type motorcycle 100.

E. An Idling State

In the scooter type motorcycle 100, first, the electric power accumulated in the battery 400 (see FIG. 1) is supplied to the generator 270 so that the generator 270 works as a motor to start the engine by the rotational force thereof. In the idling state after the engine 210 starts, the engine 210 drives the generator 270 through the power distributing device 250. The electric power generated by the operation of the generator 270 is used to charge the battery 400 or is supplied to the motor 230.

During operation of the drive unit 200 in an idling state, the generator 270 is powered to rotate and to function as a starter motor. The sun gear 254 rotates together with the rotation of the generator 270. In the idling state, the scooter type motorcycle 100 does not move and the ring gear 258 does not rotate.

Thus, when the sun gear 254 rotates, the respective planetary gears 256 that engage the sun gear 254 revolve around the sun gear 254 while rotating. Accordingly, the planetary gear carrier 252 rotates about the axis of the power transmitting shaft 280 via the planetary pins 25 that support the planetary gears 256. The rotation of the planetary gear carrier 252 is transmitted to the crankshaft 211 through the intermediate gear 220 to start the engine 210.

After the engine 210 starts, the planetary gear carrier 252 and the respective planetary gears 256 rotate because the ring gear 258 is at standstill.

The rotational force of the planetary gears 256 is transmitted to the sun gear 254. The sun gear 254 rotates in the reverse direction relative to the planetary gears 256. The rotation of the sun gear 254 rotates the rotor 271, and the generator 270 generates electric power, which is accumulated in the battery 400. Additionally, the motor 230 is supplied with electric power from the battery 400 or from the generator 270 to generate the drive force that is transmitted to the speed reduction gear section 286 for keeping the axle 110 in a non-rotational condition.

F. A Starting State and a Light Load Running State

In a starting state and a light load running state, the scooter type motorcycle 100 preferably starts and runs using the drive force of the motor 230, while the engine 210 drives the generator 270 to charge the battery 400.

During operation of the drive unit 200 in these states, the motor 230 is driven to rotate the axle 110 through the rear wheel drive force transmitting line to start the scooter type motorcycle 100. Under this condition, the ring gear 258 rotates together with the rotation of the rotor 231 of the motor 230. The rotation of the ring gear 258 causes the respective planetary gears 256 to rotate, which in turn cause the planetary gear carrier 252 to rotate. In this state, the planetary gear carrier 252 is also driven by the engine 210 because the engine 210 still operates continuously from the foregoing <idling state>.

The sun gear 254 rotates together with the rotation of the planetary gear carrier 252. Because the charge amount of the battery 400 (see FIG. 1) is less than the preset amount, the generator 270 generates electric power for charging the battery 400.

G. A Normal Running State

In a normal running state, when the charge amount of the battery 400 is less than the preset amount, the scooter type motorcycle 100 preferably operates in almost the same manner as operating when the charge amount of the battery 400 (see FIG. 1) is greater than the preset amount. However, the electric power generated by the generator 270 is used for charging the battery 400 before the charge amount of the battery 400 exceeds the preset amount, rather than for driving the motor 230.

H. A Special Running State such as the Acceleration State or the Hill Climbing State which Needs the Higher Output In a special running state, such as the acceleration state or the hill climbing state, the scooter type motorcycle 100 increases the speed of the engine 210 and supplies the electric power accumulated in the battery 400, together with the generated power, to the motor 230 in addition to the operations of the drive unit 200 in the <normal running state>, to output more powerful drive force. However, the electric power of the battery 400 is not supplied to the motor 230 before the charge amount of the battery 400 exceeds the preset amount. In other words, the drive force of the motor 230 generated by the maximum amount of power that can be supplied by the generator 270 at this time, and the vehicle driving force from the engine 210, are output to the rear wheel 107 before the charge amount of the battery 400 exceeds the preset amount.

I. A Deceleration State and a Braking State

In a deceleration state and a braking state, the rotation of the axle 110 is transmitted to the motor 230 through the speed reduction gear section 286 and the sprocket 284. The motor 230 rotates to act as a generator for regenerating electric power. Thus, the kinetic energy in the vehicle deceleration state and the braking state is converted to electric energy to be accumulated in the battery 400. That is, the scooter type motorcycle 100 decelerates or brakes at least in part due to the deceleration or braking action caused by the regenerative braking of the motor 230.

Additionally, the engine brake of the engine 210 is used for minimum deceleration, so as not to interfere with the deceleration or braking action caused by the regenerative braking of the motor 230. The rotor 271 of the generator 270 is thus preferably controlled within the limit where the rotor 271 does not overly rotate together with the rotor 231 of the motor 230.

As thus described, the scooter type motorcycle 100 having the drive unit 200 is provided with the crankshaft 211 extending in the transverse direction, i.e., extending generally normal to the center axis A of the vehicle, and the power transmitting shaft 280 extending parallel to the crankshaft 211. The generator 270, the power distributing device 250 and the motor 230 are disposed on the power transmitting shaft 280. The power from the engine 210 is input into the power distributing device 250, which is generally arranged along the vehicle center axis A and is disposed between the generator 270 and the motor 230.

The power of the engine 210 is transmitted to the generator 270, the motor 230 and the rear wheel 107 through the power distributing device 250. That is, the power of the engine 210 is input generally into the center portion of the power transmitting shaft 280 in the transverse direction, on which the generator 270, the power distributing device 250 and the motor 230 are juxtaposed in the plan view, and which are rotatable about the same axis.

That is, in the illustrated embodiment of one of the hybrid vehicles having the power distributing device that distributes the torque, the crankshaft 211 of the engine 210, the generator 270, the power distributing device 250 and the rotational shaft (i.e., the power transmitting shaft 280) of the motor 230 are not coaxially positioned.

Thus, effective power transmission is achieved with a crankshaft 211 that is shorter in comparison with the conventional hybrid type drive unit in which the engine 210, the motor 230, and the generator 270 are disposed on a single shaft. That is, the drive unit 200 in this embodiment, differently from the conventional unit, can be compact and does not need to be long enough to have the engine, the motor, the power distributing device and the generator disposed on the single shaft in the body of the hybrid vehicle.

That is, in the conventional hybrid type drive unit, when the engine, the motor, the power distributing device and the generator are coaxially positioned on the shaft in this order, the shaft portion transmitting the power from the engine needs to be sufficiently long to accommodate the axial length of the generator. Thus, in the structure in which the engine, the motor, the power distributing device and the generator are disposed on a single shaft, a shaft member covering all of those devices cannot be neglected. Because such a long shaft can have torsional vibrations that resonate with the vibrations occurring when the engine operates (i.e., the torque fluctuations by the rotation of the crankshaft), a clutch device, such as a relief clutch, or a torsional vibration preventing device, such as a torsional damper, need to be attached to the shaft. That is, the conventional hybrid type drive unit having a power distributing device requires a device that prevents the torsional vibrations from acting on the shaft portion where the engine, the motor, the power distributing device and the generator are juxtaposed in-line. Thus, in the hybrid type drive unit having the power distributing device, and also including the power transmitting system coaxially disposed, the space covering the length of the torsional vibration preventing device is necessary as a mount space, in addition to the space covering the lengths of the engine, the motor, the power distributing device and the generator. Accordingly, it is difficult to compactly mount a conventional hybrid type drive unit having the power distributing device and also including a coaxial power transmitting system in a motorcycle because the motorcycle has a very limited space for mounting components.

In contrast, the drive unit 200 in this embodiment does not need to have a length that encompasses the engine 210, the motor 230, the power distributing device 250 and the generator 270, which can be juxtaposed in-line in the vehicle body on which the drive unit 200 is mounted. Thus, even the motorcycle, which has only limited space, can allow these components to be compactly mounted. That is, in the scooter type motorcycle 100, the engine 210, the motor 230, the power distributing device 250 and the generator 270 are advantageously compactly disposed in the limited space below the seat.

In the scooter type motorcycle 100, the power of the engine 210 is output from the central portion of the crankshaft 211 in the transverse direction to the central portion of the power transmitting shaft 280 generally along the vehicle center axis A.

The engine power is transmitted from the crankshaft 211 through the intermediate gear 220 to the power distributing device 250 positioned generally at the center of the power transmitting shaft 280, on which the generator 270, the power distributing device 250 and the motor 230 are disposed, preferably in this order, from the outer circumference of the planetary gear carrier 252. Accordingly, there is no need to provide an additional device that can receive the drive force of the crankshaft 211 to output it to the power distributing device 250 on the power transmitting shaft 280, which is a different shaft from the crankshaft 211, and on which the generator 270, the power distributing device 250 and the motor 230 are disposed. A more compact structure is thus advantageously realized.

As shown in FIG. 2, the engine power transmitting line that transmits the power of the engine 210 to the power transmitting shaft 280 is preferably offset relative to the vehicle center axis A and disposed on an opposite side of the center axis A from the side having the rear wheel drive force transmitting line. Thus, the drive power transmitting system of the scooter type motorcycle 100 is advantageously well balanced between the right and left sides of the vehicle.

In the illustrated embodiment, the shaft portion of the rotor 271 of the generator 270 is elongated to form the power transmitting shaft 280 on which the power distributing device 250 and the motor 230 are disposed. In addition, the ring gear 258 of the power distributing device 250 and the rotor 231 of the motor 230 are coupled with each other around the power transmitting shaft 280.

That is, in the hybrid type drive unit 200 of the scooter type motorcycle, the shaft member extending through the motor 230, the power distributing device 250 and the generator 270 is the portion of the power transmitting shaft which is the elongated shaft portion of the rotor 271 of the generator 270. That is, unlike the hybrid type drive unit having a conventional power distributing device, there is no need to provide any additional shaft in the shaft portion of the generator for transmitting the engine power in order to provide effective power transmission.

As thus discussed, in this embodiment, unlike the structure of the conventional hybrid drive device, there is no need to provide a narrow and long shaft extending through the shaft portion of the generator. Thus, the power transmitting shaft 280, which is a different shaft from the crankshaft 211, can advantageously have an outer diameter sized to inhibit torsional vibrations generated by the torque fluctuations of engine operation. The power transmitting shaft 280 thus does not resonate with the engine vibrations. Accordingly, the drive unit 200 does not require any clutch device or torsional vibration preventing device to prevent the torsional vibrations from occurring at the shaft of the drive power transmitting system due to the resonance of the engine vibrations. The drive unit can thus be made compact.

Specifically, the scooter type motorcycle 100 does not need any clutch mechanism that can connect or disconnect the power transmission or make the power transmission slip, or any torsional damper that can absorb or attenuate the torque fluctuations of the engine 210, in the rotational force transmitting path from the crankshaft 211 to the power distributing device 250.

Also, according to the drive unit 200, because the torque fluctuations of the crankshaft 211 are decreased, current ripples of the generator 270 caused by the torque fluctuations are also decreased. Thus, any inconveniences caused by the current ripples can be reduced.

As shown in FIG. 2, the drive unit 200 of the scooter type motorcycle 100 incorporates the intermediate gear 220 between the crankshaft 211 and the planetary gear carrier 252 on the power transmitting shaft 280 as the structure through which the engine power is transmitted from the crankshaft 211 to the power transmitting shaft 280. Thus, the position of the intermediate gear 220 and the reduction ratio can be freely changed without changing the positions or the outer diameters of the crankshaft 211 and the power transmitting shaft 280.

Thus, by changing the position or the reduction ratio of the intermediate gear 220, the primary reduction ratio that can maintain the engine performance, the generator performance, the motor performance, and the vehicle performance of the hybrid type drive unit in a suitable balance can be properly and easily set.

In the drive unit 200 of this embodiment, the engine power is transmitted to the power distributing device 250 from the crankshaft 211 through the intermediate gear 220. Because of this arrangement, the structure of the drive unit 200 is advantageously more compact than another structure in which the crank gear 218 and the gear teeth 252a of the outer circumference of the planetary gear carrier 252 directly engage with each other. For instance, if the crank gear 218 and the planetary gear carrier 252 directly engaged with each other, it would be necessary that the crank gear have an outer diameter larger than the outer diameter of the counter weight of the crankshaft and/or that the planetary gear carrier have an outer diameter larger than the outer circumference of the motor. As a result, the drive unit would need to be larger than the drive unit 200 in the illustrated embodiment that incorporates the intermediate gear 220.

In addition, in the structure having the intermediate gear 220 linking the crank gear 218 of the crankshaft 211 and the power distributing device 250, the intermediate gear 220 can be separately changed after being assembled. Accordingly, the structure can be more easily assembled or disassembled than another structure in which a chain is used for transmission. That is, if the chain is used, a tension adjusting mechanism is necessary to loosen or tighten the chain while the chain is attached and can increase the man-hours for assembling the drive unit 200.

In the drive unit 200 described above, spaces are created on both sides of the intermediate gear 220 (i.e., right and left sides of the vehicle), and between the crankshaft 211 and the block of the generator 270, the power distributing device 250 and the motor 230 in the plan view. An automatic adjusting mechanism thus can be assembled using at least one of the spaces to automatically make adjustments of backlashes at the intermediate gear 220. The assembly of this mechanism can be easily performed because the space for the automatic backlash adjusting mechanism can be ensured.

As shown in FIGS. 3, 4 and 7, in the drive unit 200 of the scooter type motorcycle 100, the intermediate gear shaft 220a of the intermediate gear 220 having the balance weights 225 is preferably positioned below the crankshaft 211 and the power transmitting shaft 280. Thus, if the drive unit 200 has another balance weight or another set of balance weights at a symmetrical location of the balance weights 225 relative to the axis of the crankshaft 211, the location needs to be a position X (see FIG. 1) which is positioned in a front area of the drive unit 200 and adjacent to bottom ends of the respective cylinders.

Advantageously, the balance weight(s) disposed at the position X indicated in FIG. 1 does not hinder positioning of an exhaust pipe of the engine, which is not shown. This is convenient because such another balance weight(s) disposed in the drive unit 200 in addition to the balance weights 225 can contribute to more efficient cancellation of the reciprocal inertia caused by the pistons of the engine 210.

In the illustrated embodiment, the hybrid type drive unit 200 having the power transmitting device 250 is disposed below the seat of the motorcycle. Specifically, the drive unit 200 is efficiently disposed in the limited space below the tandem seat 104 and the trunk space 105 (see FIG. 1). Thus, in the motorcycle, the drive unit 200 does not affect other components other than the drive system. The drive unit 200 thus can allow the rider to have various riding positions and can give wide varieties of possible external designs.

The drive unit 200 of this embodiment is mounted on the series-parallel type and scooter type motorcycle 100. However, this invention is not limited to the drive unit. For example, the drive unit having the structure in which the generator, the motor and the power distributing device are disposed on a shaft different from the crankshaft of the engine and parallel to the crankshaft can be mounted on a parallel type hybrid vehicle.

The drive unit for use with a hybrid vehicle preferably includes an engine; a generator that generates electric power via the operation of the engine. An electric motor is driven by the electric power of the generator to rotate a drive wheel. A power distributing device distributes the drive power generated by the engine between the generator and the drive wheel, in which the generator, the motor and the power distributing device are disposed on a single shaft, which is different from a crankshaft of the engine and extends parallel to the crankshaft.

According to the construction, the generator, the motor and the power distributing device are not juxtaposed with the crankshaft, because the generator, the motor and the power distributing device are disposed on a single shaft, which is different from the crankshaft of the engine and extends parallel to the crankshaft. That is, the structure including the engine, the generator, the motor, and the power distributing device is not elongate and can be compact. Thus, with the crankshaft extending in the transverse direction, the generator, the engine and the motor can be mounted without protruding in the transverse direction. The drive unit thus can be suitably and easily mounted on a vehicle, e.g., a motorcycle, which has a limited space.

Also, according to the construction, no power transmitting shaft connected to one end of the crankshaft and extending through the sun gear or ring gear of the power distributing device is necessary in comparison with the conventional structure in which the generator, the motor and the power distributing device are juxtaposed on the shaft that has the same axis as the crankshaft. That is, the present structure can avoid the torsional vibrations occurring in the power transmitting shaft in the conventional structure when the torque fluctuations of the crankshaft in the engine output is transmitted to the drive unit.

In the drive unit for use with a hybrid vehicle according to the construction described above, the crankshaft of the engine preferably extends horizontally and normal to a direction in which the vehicle advances.

According to the construction, the single shaft different from the crankshaft extends normal to the direction in which the vehicle advances and horizontally. Thus, a motorcycle having a limited mount space for the drive unit can have the hybrid type drive unit with no portion of the drive unit protruding in the transverse direction.

In addition, because both of the crankshaft and the separate shaft extend in the transverse direction, the power of the engine and the drive force of the motor, both output from the separate shaft can be transmitted to the axle, which is disposed in the transverse direction and journals the rear wheel in a simple structure.

In the drive unit for a hybrid vehicle according to the construction described above, the different shaft is preferably positioned in the rear of the crankshaft of the engine.

According to the construction, the axle of the drive wheel can be easily positioned in the rear of the different shaft, and the hybrid vehicle in which the rear wheel is the drive wheel can be easily realized.

The drive unit for a hybrid vehicle according to the construction described above preferably further includes an axle of the drive wheel that is spaced apart from the different shaft and extends parallel thereto. A drive force transmitting device extends normal to the different shaft. The drive power of the motor and the drive power of the engine are preferably transmitted from one end of the different shaft to transmit the respective drive powers to the axle, in which the motor is disposed on one end of the different shaft. However, in another embodiment, the drive power of the motor and the drive power of the engine can be transmitted to the axle via a different section of the different shaft.

According to this construction, because the motor is positioned adjacent to the drive force transmitting device, the drive force of the motor can be directly transmitted to the drive force transmitting device. That is, the length of the member that transmits the drive force, i.e., the rotational force of the rotor of the motor, to the drive force transmitting device can be shorter. The resonance caused by the torque vibrations occurring in the engine operation can be mostly avoided.

In the drive unit for a hybrid vehicle according to the construction described above, the drive force transmitting device preferably includes a reducing section reducing the drive power taken out from the one end.

According to the construction, the drive power taken out from the one end can be properly reduced before the drive power is transmitted to the drive wheel. Alternatively, the reducing section can be disposed at one end of the different shaft to rotate about the axis of the different shaft so as to reduce the drive force outputted from the one end. In another variation, the reducing section can be positioned between the one end of the different shaft and the axle.

The drive unit for a hybrid vehicle according to the construction described above preferably further includes an engine power transmitting section that transmits the power generated by the engine to the power distributing device via a generally central portion of the crankshaft in the axial direction thereof. The power distributing device is disposed on the different shaft and between the generator and the motor.

According to the construction, the engine power transmitted to the power distributing device from the crankshaft can be transmitted generally in the center portion of the vehicle, on which the drive unit is mounted, in the transverse direction.

That is, the shaft portion which generates the vibrations in the engine operation can be short.

In the drive unit for a hybrid vehicle according to the construction described above, the different shaft is preferably coupled with a rotor of the generator. The power distributing device includes a sun gear disposed on the different shaft that rotates together with the different shaft about a common axis. A planetary gear is positioned around the sun gear to engage with the sun gear. A planetary gear carrier is positioned around the different shaft to support the planetary gear for rotation; and a ring gear is positioned around the planetary gear to engage with the planetary gear. The ring gear is also positioned around the different shaft for rotation to output rotational force of the different shaft to the drive wheel. The planetary gear carrier has an outer circumferential portion connected to the engine power transmitting section and rotates around the different shaft. The planetary gear revolves around the sun gear using the power of the engine input from the outer circumferential portion through the engine power transmitting section.

According to the construction, the power distributing device disposed on the different shaft and positioned generally at the center portion in the transverse direction between the motor and the generator is the planetary gear mechanism. The engine power is input from the outer circumferential portion of the planetary gear carrier through the engine power transmitting section.

That is, unlike the conventional structure, the engine power transmitted to the power distributing device from the crankshaft can be input to the power distributing device from the generally center portion of the different shaft. The engine power can be transmitted in the transverse direction, through the engine power transmitting section, without rotating the planetary gear carrier by being inputted from an end of the different shaft.

Accordingly, in the drive power unit, the so-called center-take-off type structure in which the engine power is taken from the generally center portion of the crankshaft in the transverse direction though the engine power transmitting section can be realized. The hybrid type drive unit thus can be compactly formed.

In the drive unit for a hybrid vehicle according to the construction described above, the ring gear is preferably directly coupled with a rotor of the motor rotating about a common axis of the ring gear and the rotor of the motor, and the ring gear outputs rotational force thereof to the drive wheel through the rotor of the motor.

According to the construction, because the ring gear is directly coupled with the rotor of the motor, the length of the power distributing device in the axial direction can be shorter. Thereby, the entire length of the motor, the power distributing device and the generator in the axial direction can be shorter. Thus, the entire length of the drive power unit having the crankshaft extending in the transverse direction and horizontally can be shorter in the transverse direction. The motorcycle which has the narrow width thus can easily have the drive unit.

In the drive unit for a hybrid vehicle according to the construction described above, the engine power transmitting section preferably includes a rotary member synchronously rotating with the rotation of the crankshaft, and a transferring section transferring rotational force of the rotary member to the outer circumferential portion of the planetary gear carrier.

According to the construction, the rotary member and the transferring section can rotate the planetary gear carrier. The engine power thus can be transferred to the power distributing device from the crankshaft in such a simple structure. Additionally, as respective constructions of the rotary member and the transferring section, both of them can have gear teeth engaging with each other, and the planetary gear carrier can have gear teeth on its outer circumferential surface that engage with the gear teeth of the transferring section. Alternatively, the rotary member can be a sprocket, while the transferring section can be a chain, and the chain can be wound around the outer circumference of the planetary gear carrier. In this structure, the planetary gear carrier can have multiple teeth that can engage with the chain on its outer circumferential surface. In another alternative, the rotary member can be a pulley, while the transferring section can be a belt wound around the pulley, which is the rotary member, and the outer circumference of the planetary gear carrier.

In the drive unit for a hybrid vehicle according to the construction described above, respective outer circumferential portions of the rotary member and the planetary gear carrier preferably have a plurality of gear teeth, and the transferring section is preferably positioned between the rotary member and the planetary gear carrier to form an intermediate gear engaging with the respective gear teeth of the rotary member and the planetary gear carrier.

According to the construction, only by providing the intermediate gear between the crankshaft and the planetary gear carrier, the structure in which the engine power is certainly transmitted to the planetary gear carrier from the crankshaft can be easily realized.

In the drive unit for a hybrid vehicle according to the construction described above, the planetary gear carrier preferably has a plate-like carrier body through which the different shaft extends and which supports the planetary gear. The outer circumferential portion of the planetary gear carrier has a tubular shape protruding toward the ring gear from an outer periphery of the carrier body to surround the ring gear.

According to the construction, the carrier body of the planetary gear carrier has the plate-like shape and the outer circumferential portion thereof surrounds the ring gear. Thus, the outer circumferential portion and the ring gear overlap with each other in the radial direction relative to the axis of the different shaft. The length of the power transmitting device in the axial direction thus can be shorter to the extent that the carrier body has the plate-like shape and also the outer circumferential portion and the ring gear overlap with each other. Accordingly, the total length of the motor, the power distributing device and generator in the axial direction on the different shaft can be shorter. As a result, the entire length of the drive force unit having the crankshaft extending in the transverse direction and horizontally can be shorter in the transverse direction. The drive unit thus can be mounted on the motorcycle which has such a narrow width.

The drive unit for a hybrid vehicle according to the construction described above preferably further includes an axle extending generally parallel to the different shaft and the crankshaft. The axle is preferably spaced apart from the different shaft and the crankshaft and supports the drive wheel. A drive force transmitting device is positioned at one end of the different shaft and transmits the drive power of the motor and the power of the engine to the axle. The motor is positioned on one end of the different shaft, and a line along which the power of the engine is transmitted to the power distributing device from the crankshaft through the engine power transmitting section is offset toward the other end of the different shaft from a perpendicular plane extending through a transverse center of the drive wheel.

According to the construction, the line that transmits the engine power to the power distributing device which is disposed between the generator and the motor on the different shaft is offset toward the other end of the different shaft from the perpendicular plane extending through the transverse center of the drive wheel. Thus, even though the motor, which axial size (width) is generally larger than that of the generator, is positioned at the one end of the shaft portion and the drive force transmitting device is also positioned at the one end of the shaft portion, the vehicle in which the drive unit having the line which transmits the engine power to the power distributing device from the crankshaft, particularly, the motorcycle, can be balanced in the transverse direction.

In the drive unit for a hybrid vehicle according to the construction described above, the intermediate gear preferably has an adjusting section adjusting a backlash between the intermediate gear and the rotary member and another backlash between the intermediate gear and the planetary gear carrier.

According to the construction, because the backlashes between the rotary member and the planetary gear carrier can be adjusted in the intermediate gear, the engine power can be smoothly and certainly transmitted to the power distributing device from the crankshaft.

In the drive unit for a hybrid vehicle according to the construction described above, the intermediate gear preferably has a weight section offset from an axis of the intermediate gear and canceling the reciprocal inertia of the engine.

According to the construction, the weight section of the intermediate gear can cancel the reciprocal inertia of the engine that inevitably occurs when the engine operates, i.e., when the pistons reciprocally move. Thus, the entire vibrations of the drive unit generated in the engine operation can decrease.

In the drive unit for a hybrid vehicle according to the construction described above, the engine is preferably a multi-cylinder engine, and ignitions are made at equal intervals among respective cylinders.

According to the construction, the connecting rod of each cylinder is connected to the crankshaft for rotation at a balancing position between the one end and the other end of the crankshaft in the axial direction, as the center of the crankshaft in the axial direction being the reference point.

Because the engine power, i.e., the rotational force of the crankshaft is taken out from the generally center portion of the crankshaft, to which the connecting rods are connected, in the axial direction through the engine power transmitting section, as thus discussed, the torsional vibrations generated in the crankshaft of the engine can be effectively reduced.

The hybrid vehicle preferably has the drive unit described above.

According to the construction, the hybrid vehicle can have the drive unit, which is shortened and includes the compactly made engine, generator, motor and power transmitting device in the narrow and limited mount space. Thus, if a conventional vehicle is changed to a hybrid type vehicle, its drive unit can be simply changed to the hybrid type drive unit discussed above without other components of the vehicle being greatly changed. Accordingly, the hybrid vehicle can be realized without increasing the manufacturing cost. Also, the hybrid vehicle can allow the rider to have various riding positions and can give wide varieties of possible external designs.

In one embodiment, the hybrid vehicle is preferably a motorcycle with the drive unit described above.

According to the construction, the motorcycle can be the hybrid type vehicle that has the drive unit which is shortened and which includes the compactly made engine, generator, motor and power transmitting device in the narrow and limited mount space. Thus, if a conventional motorcycle is changed to a hybrid type motorcycle, its drive unit can be simply changed to the hybrid type drive unit discussed above without other components of the vehicle being greatly changed. Accordingly, the hybrid vehicle can be realized without increasing the manufacturing cost. Also, the hybrid vehicle can allow the rider to have various riding positions and can give wide varieties of possible external designs.

The drive unit for a hybrid vehicle according to the embodiments discussed above provides the effect that, even though the crankshaft extends in the transverse direction, the generator, the engine and the motor can be suitably and easily mounted on the drive unit without protruding greatly. Consequently, the drive unit is useful for the motorcycle which only has such a limited mount space.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A drive unit for a hybrid vehicle, comprising:
   an engine having a crankshaft;
   a generator configured to generate electric power via the operation of said engine;
   an electric motor driven by the electric power of said generator, the electric motor configured to rotate a drive wheel; and
   a power distributing device configured to distribute the drive power generated by said engine between said generator and said drive wheel,
   said generator, said motor and said power distributing device being disposed together on a single shaft separate from and extending generally parallel to the crankshaft of the engine.

2. The drive unit for a hybrid vehicle according to claim 1, wherein the crankshaft of said engine extends generally normal to a longitudinal axis of the vehicle.

3. The drive unit for a hybrid vehicle according to claim 2, wherein said shaft is positioned rearwardly of the crankshaft of said engine.

4. The drive unit for a hybrid vehicle according to claim 2, further comprising:
   an axle of said drive wheel spaced apart from said shaft, the axle extending parallel to the shaft; and
   a drive force transmitting device extending generally normal to said shaft, the drive force transmitting device coupling together a drive power of said motor and a drive power of said engine to said axle,
   wherein said motor is disposed on said one end of said shaft.

5. The drive unit for a hybrid vehicle according to claim 4, wherein drive force transmitting device couples together the drive power of the motor and the drive power of the engine to the axle at an end of the shaft.

6. The drive unit for a hybrid vehicle according to claim 4, wherein said drive force transmitting device includes a reducing section configured to reduce the drive power transmitted through said one end.

7. The drive unit for a hybrid vehicle according to claim 2 further comprising:
   an engine power transmitting section configured to transmit the power generated by said engine from a generally central axial portion of said crankshaft to said power distributing device,
   wherein said power distributing device is disposed on said shaft and between said generator and said motor.

8. The drive unit for a hybrid vehicle according to claim 7, wherein said shaft is coupled with a rotor of said generator, said power distributing device comprising:
   a sun gear disposed on said shaft and configured to rotate together with said shaft about a common axis;
   a planetary gear positioned around said sun gear and configured to engage with said sun gear, the planetary gear further configured to rotate about said sun gear;
   a planetary gear carrier rotationally positioned around said shaft, the planetary gear carrier configured to support said planetary gear; and
   a ring gear positioned around said planetary gear and configured to engage with said planetary gear, the ring gear further rotationally positioned around said shaft and configured to output a rotational force of said shaft to said drive wheel,
   wherein said planetary gear carrier has an outer circumferential portion coupled to said engine power transmitting section and is configured to rotate around said shaft, and
   wherein said planetary gear revolves around said sun gear using the power of said engine input from said outer circumferential portion through said engine power transmitting section.

9. The drive unit for a hybrid vehicle according to claim 8, wherein the rotor of the generator is disposed within a stator of the generator.

10. The drive unit for a hybrid vehicle according to claim 8, wherein said ring gear is directly coupled with a rotor of said motor and said ring gear transmits a rotational force thereof to said drive wheel through the rotor of said motor.

11. The drive unit for a hybrid vehicle according to claim 8, wherein said engine power transmitting section includes a rotary member configured to synchronously rotate with the rotation of said crankshaft, and a transferring section configured to transfer rotational force of said rotary member to the outer circumferential portion of said planetary gear carrier.

12. The drive unit for a hybrid vehicle according to claim 11, wherein respective outer circumferential portions of said rotary member and said planetary gear carrier have a plurality of gear teeth, and said transferring section is positioned between said rotary member and said planetary gear carrier to form an intermediate gear engaging with the respective gear teeth of said rotary member and said planetary gear carrier.

13. The drive unit for a hybrid vehicle according to claim 11, wherein said planetary gear carrier has a plate-like carrier body through which the shaft extends and which supports said planetary gear, and the outer circumferential portion of said planetary gear carrier has a tubular shape protruding toward said ring gear from an outer periphery of said carrier body so as to surround said ring gear.

14. The drive unit for a hybrid vehicle according to claim 7 further comprising:

an axle extending generally parallel to said shaft and said crankshaft, said axle being spaced apart from said shaft and said crankshaft, said axle supporting said drive wheel; and a drive force transmitting device positioned at one end of said shaft and configured to transmit the drive power of said motor and the power of said engine to said axle, said motor positioned on said one end of said shaft; and a line along which the power of said engine is transmitted from said crankshaft through said engine power transmitting section to said power distributing device, the line being offset toward an opposite end of said shaft from a perpendicular plane extending through a transverse center of said drive wheel.

15. The drive unit for a hybrid vehicle according to claim 12, wherein said intermediate gear comprises an adjusting section configured to adjust a backlash between said intermediate gear and said rotary member, and configured to adjust another backlash between said intermediate gear and said planetary gear carrier.

16. The drive unit for a hybrid vehicle according to claim 12, wherein said intermediate gear comprises a weight section offset from an axis of said intermediate gear, the weight section configured to cancel the reciprocal inertia of said engine.

17. The drive unit for a hybrid vehicle according to claim 7, wherein said engine is a multi-cylinder engine and ignitions are made at equal intervals among respective cylinders.

18. A hybrid vehicle comprising the drive unit according to claim 1.

19. A motorcycle comprising the drive unit according to claim 1.

* * * * *